United States Patent
Dotzauer et al.

(10) Patent No.: US 12,435,298 B2
(45) Date of Patent: *Oct. 7, 2025

(54) STAIN REMOVAL THROUGH NOVEL OXIDIZER AND CHELANT COMBINATION

(71) Applicant: ECOLAB USA INC., Saint Paul, MN (US)

(72) Inventors: David Dotzauer, Saint Paul, MN (US); John Mansergh, Saint Paul, MN (US); Krista Otting, Saint Paul, MN (US); Tobias Neil Foster, Saint Paul, MN (US)

(73) Assignee: ECOLAB USA INC., Saint Paul, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/747,970

(22) Filed: Jun. 19, 2024

(65) Prior Publication Data

US 2024/0336878 A1    Oct. 10, 2024

Related U.S. Application Data

(60) Continuation of application No. 17/451,057, filed on Oct. 15, 2021, now Pat. No. 12,054,694, which is a division of application No. 15/741,685, filed as application No. PCT/EP2015/065399 on Jul. 6, 2015, now abandoned.

(51) Int. Cl.
| | |
|---|---|
| *C11D 3/39* | (2006.01) |
| *B08B 3/08* | (2006.01) |
| *C11D 3/06* | (2006.01) |
| *C11D 3/10* | (2006.01) |
| *C11D 3/33* | (2006.01) |
| *C11D 7/12* | (2006.01) |
| *C11D 7/16* | (2006.01) |
| *C11D 7/32* | (2006.01) |

(52) U.S. Cl.
CPC ............... *C11D 3/393* (2013.01); *B08B 3/08* (2013.01); *C11D 3/06* (2013.01); *C11D 3/10* (2013.01); *C11D 3/33* (2013.01); *C11D 3/3932* (2013.01); *C11D 7/12* (2013.01); *C11D 7/16* (2013.01); *C11D 7/3245* (2013.01); *C11D 2111/24* (2024.01)

(58) Field of Classification Search
CPC .. C11D 3/393; C11D 3/06; C11D 3/10; C11D 3/33; C11D 3/3932; C11D 7/12; C11D 7/16; C11D 7/3245; C11D 2111/24; B08B 3/08

See application file for complete search history.

(56) References Cited

U.S. PATENT DOCUMENTS

| | | |
|---|---|---|
| 5,397,506 A | 3/1995 | Groth et al. |
| 5,559,089 A | 9/1996 | Hartman et al. |
| 5,904,735 A | 5/1999 | Gutierrez et al. |
| 5,955,415 A | 9/1999 | Gutierrez et al. |
| 5,985,817 A | 11/1999 | Weibel et al. |
| 6,159,922 A | 12/2000 | Williams |
| 6,162,259 A | 12/2000 | Williams (nee Mac Beath) |
| 6,426,229 B1 | 7/2002 | Yamamoto et al. |
| 6,703,357 B1 | 3/2004 | Maurer et al. |
| 7,045,016 B2 | 5/2006 | De Dominicis et al. |
| 7,465,411 B2 | 12/2008 | Martin |
| 12,054,694 B2 * | 8/2024 | Dotzauer ............ C11D 7/16 |
| 2003/0073596 A1 | 4/2003 | Chiou et al. |
| 2003/0213503 A1 | 11/2003 | Price et al. |
| 2003/0216271 A1 | 11/2003 | Scheper et al. |
| 2004/0241820 A1 | 12/2004 | Outtrup et al. |
| 2005/0075257 A1 | 4/2005 | Scheper et al. |
| 2006/0096618 A1 | 5/2006 | Price et al. |
| 2006/0217280 A1 | 9/2006 | Scheper et al. |
| 2007/0054829 A1 | 3/2007 | Gentschev et al. |
| 2009/0215663 A1 | 8/2009 | Minning et al. |
| 2010/0152088 A1 | 6/2010 | Estell et al. |
| 2010/0222247 A1 | 9/2010 | Zipfel et al. |
| 2010/0249007 A1 | 9/2010 | Holderbaum et al. |
| 2011/0166055 A1 | 7/2011 | Reinhardt et al. |
| 2011/0281327 A1 | 11/2011 | Bott et al. |
| 2012/0291815 A1 | 11/2012 | Monsrud et al. |

(Continued)

FOREIGN PATENT DOCUMENTS

| | | |
|---|---|---|
| CN | 104321364 A | 1/2015 |
| EP | 0504091 A1 | 3/1992 |

(Continued)

OTHER PUBLICATIONS

Tanizawa, Yoshiaki et al., "Black tea stain formed on the surface of teacups and pots. Part 1—Study on the chemical composition and Structure", ScienceDirect, Food Chemistry 103 (2007) 1-7, available online at www.sciencedirect.com Jun. 6, 2005.

Yamada, Kaoru et al., "Black tea stain formed on the surface of teacups and pots. Part 2—Study of the structure change caused by aging and calcuim addition", ScienceDirect, Food Chemistry 103 (2007) 8-14, available online at www.sciencedirect.com Jun. 20, 2005.

European Patent Office, "International Search Report", issued in connection with International Application No. PCT/EP2015/065399, filed Jul. 6, 2015, mailed Oct. 3, 2016, 11 pages. 2016.

*Primary Examiner* — Alexander Markoff

(74) *Attorney, Agent, or Firm* — McKee, Voorhees & Sease, PLC

(57) ABSTRACT

The present invention relates to a detergent composition comprising alkali metal carbonate, a chelant selected from the group consisting of MGDA, alkali metal tripolyphosphate, GLDA, and mixtures thereof, alkali metal percarbonate, and a peroxidation catalyst, wherein the molar ratio of chelant to alkali metal percarbonate is in the range of 1.8 to 3.4. The detergent composition is particularly suited for the removal of tea and coffee stains.

12 Claims, No Drawings

(56) References Cited

U.S. PATENT DOCUMENTS

| | | |
|---|---|---|
| 2012/0318303 A1 | 12/2012 | Miralles et al. |
| 2013/0175196 A1 | 7/2013 | Dale et al. |
| 2013/0199569 A1 | 8/2013 | Cabirol et al. |
| 2013/0206181 A1 | 8/2013 | Giles et al. |
| 2013/0303424 A1 | 11/2013 | Scialla et al. |
| 2013/0303725 A1 | 11/2013 | Dobrawa et al. |
| 2014/0106439 A1 | 4/2014 | Mussmann et al. |
| 2015/0361383 A1 | 12/2015 | Dotzauer et al. |
| 2018/0216041 A1 | 8/2018 | Dotzauer et al. |
| 2022/0033740 A1 | 2/2022 | Dotzauer et al. |
| 2022/0169957 A1 | 6/2022 | Lukic et al. |
| 2022/0298452 A1 | 9/2022 | Arif et al. |

FOREIGN PATENT DOCUMENTS

| | | |
|---|---|---|
| EP | 0504091 B1 | 3/1992 |
| EP | 0677576 A2 | 10/1995 |
| EP | 0677576 A3 | 11/1997 |
| EP | 2662436 A1 | 11/2011 |
| EP | 2350249 B1 | 4/2014 |
| JP | 2011219527 A | 11/2011 |
| WO | 9533811 A1 | 12/1995 |
| WO | 9622351 A1 | 7/1996 |
| WO | 9623859 A1 | 8/1996 |
| WO | 9736991 A1 | 10/1997 |
| WO | 9835005 A1 | 8/1998 |
| WO | 9925802 A1 | 5/1999 |
| WO | 0050552 A1 | 2/2000 |
| WO | 0142417 A1 | 6/2001 |
| WO | 0144452 A1 | 6/2001 |
| WO | 0185890 A1 | 11/2001 |
| WO | 2008110760 A1 | 9/2008 |
| WO | 2010138907 A1 | 12/2010 |
| WO | 2011143602 A1 | 11/2011 |
| WO | 2012025740 A1 | 3/2012 |
| WO | 2012038755 A1 | 3/2012 |
| WO | 2012143315 A1 | 10/2012 |
| WO | 2012172465 A2 | 12/2012 |
| WO | 2013167467 A1 | 11/2013 |
| WO | 2014177217 A1 | 11/2014 |
| WO | 2015032447 A1 | 3/2015 |
| WO | 2015124384 A1 | 8/2015 |

\* cited by examiner

STAIN REMOVAL THROUGH NOVEL OXIDIZER AND CHELANT COMBINATION

CROSS-REFERENCE TO RELATED APPLICATIONS

This application is a Continuation of U.S. Ser. No. 17/451,057, filed Oct. 15, 2021, which is a Divisional Application of U.S. Ser. No. 15/741,685, filed on Jan. 3, 2018, which claims priority and is related to U.S. National Phase Application Serial No. PCT/EP2015/065399, filed on Jul. 6, 2015, all of which are hereby expressly incorporated herein by reference.

FIELD OF THE INVENTION

The present invention relates to ash-based detergent compositions for the removal of tea and coffee stains in ware washing applications, comprising a chelant, percarbonate, and a peroxidation catalyst.

BACKGROUND

The performance of detergent compositions intended for warewashing applications is measured based on their ability to remove tea and coffee stains as well as starch soil. Tea and coffee stains are thought to comprise oxidized polyphenols (e.g. tannins) bridged by calcium silicate, and represent a type of soil that is particularly difficult to dissolve.

It is known in the art that chelants that bind to metal ions and thereby reduce the concentration of free metal ions in aqueous systems can also help to redissolve scale by sequestering the metal ions that are bound to precipitated scale. Chelants have, therefore, been used in detergent compositions to improve the removal of tea and coffee stains.

WO 2015/032447 A1, for example, has disclosed that a combination of the chelants methylglycinediacetic acid (MGDA), glutamic acid N,N-diacetic acid (GLDA), and sodium tripolyphosphate (STPP) exhibits synergy in a carbonate-based detergent composition with respect to the removal of tea and coffee stains.

To further improve the cleaning performance of detergent compositions, it is also known to include bleaching agents, such as percarbonate. These bleaching agents are often supplemented with bleach activators, such as iron or manganese containing peroxidation catalysts. This approach has been particularly effective for the removal of starch soil.

WO 2014/177217 A1, for example, has disclosed that a carbonate-based detergent composition comprising alkali metal percarbonate and an iron or manganese complex as peroxidation catalyst provides a highly efficient warewashing detergent for the removal of starch soil. US 2011/166055 A1 has disclosed the use of manganese oxalates to improve the bleaching performance of detergent compositions, in particular with respect to tea soil. US 2010/249007 A1 has disclosed the use of a carbonate-based detergent composition comprising a bleaching agent and a bleach catalyst for the removal of tea stains.

It is also known to combine chelants and bleaching agents with peroxidation catalysts in a single detergent composition. For instance, WO 2012/025740 A1 has disclosed that a detergent composition comprising MGDA, a bleaching compound and manganese oxalate as an oxidation catalyst provides improved bleaching performance of e.g. tea cups.

However, all examples from the prior art so far employ high levels of chelant to achieve the desired stain removal performance. There is, however, the need to minimize chelant use to make detergent compositions as cost efficient as possible.

It is, therefore, the aim of the present invention to provide a composition that is highly effective at removing tea and coffee stains in ware washing applications and that minimizes the use of chelants.

It has surprisingly been found that the combination of a chelant selected from the group of MGDA, GLDA, alkali metal tripolyphosphate and mixtures thereof with percarbonate and an iron or manganese containing peroxidation catalyst exhibits synergy with respect to the removal of tea and coffee stains in an ash-based detergent composition. By synergy it is meant that enhanced stain removal is observed when combining a level of chelant below what is necessary for complete stain removal with a level of percarbonate and catalyst also below what is necessary for complete stain removal. This synergy between chelants and bleaching agent was unexpected, because chelants remove stains via a different mechanism than oxidative bleaches The present invention therefore provides a detergent composition comprising
alkali metal carbonate,
a chelant selected from the group consisting of MGDA, GLDA, alkali metal tripolyphosphate and mixtures thereof,
alkali metal percarbonate, and
a peroxidation catalyst according to formula (I)

$$[(L_pM_q)_nX_r]Y_s \qquad (I)$$

wherein
each L independently is an organic ligand containing at least three nitrogen atoms and/or at least two carboxyl groups that coordinate with the metal M;
M is Mn or Fe;
each X independently is a coordinating or bridging group selected from the group consisting of $H_2O$, $OH^-$, $SH^-$, $HO_2^-$, $O^{2-}$, $O_2^{2-}$, $S^{2-}$, $F^-$, $Cl^-$, $Br^-$, $I^-$, $NO_3^-$, $NO_2^-$, $SO_4^{2-}$, $SO_3^{2-}$, $PO_4^{3-}$, $N_3^-$, $CN^-$, $NR_3$, $NCS^-$, $RCN$, $RS^-$, $RCO_2^-$, $RO^-$, and

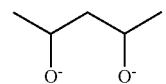

with R being hydrogen or a $C_1$ to $C_6$ alkyl group;
p is an integer from 1 to 4;
q is an integer from 1 to 2;
r is an integer from 0 to 6;
Y is a counter ion;
and
s is the number of counter ions,
wherein the molar ratio of chelant to alkali metal percarbonate is in the range of 1.8 to 3.4.

For the purpose of this invention, in particular for the purpose of calculating the molar ratio of chelant to percarbonate, alkali metal percarbonate is assumed to have the formula 2 $(M_2CO_3) \cdot 3H_2O_2$, where M represents an alkali metal. Sodium percarbonate, 2 $(Na_2CO_3) \cdot 3H_2O_2$, is particularly preferred.

The detergent composition comprises an alkali metal carbonate as a source of alkalinity. The detergent composition typically comprises at least 5 percent by weight alkali metal carbonate, preferably the composition comprises 15 to 80 percent by weight, more preferably 20 to 70 percent by weight, most preferably 35 to 60 percent by weight alkali metal carbonate.

In general, the detergent composition comprises an effective amount of alkali metal carbonate. In the context of the present invention, an effective amount of the alkali metal carbonate is an amount that provides a use solution having a pH of at least 8, preferably a pH of 9.5 to 11, more preferably 10 to 10.3. A use solution in the context of the present invention is considered a solution of 1 g/l of the detergent composition in distilled water. The pH of the use solution is meant to be determined at room temperature.

In a preferred embodiment of the present invention, the detergent composition therefore provides a pH measured at room temperature of at least 8, preferably a pH of 9.5 to 11, more preferably 10 to 11 when diluted in distilled water at a concentration of 1 gram per liter.

Suitable alkali metal carbonates are for example sodium or potassium carbonate, sodium or potassium bicarbonate, sodium or potassium sesquicarbonate, and mixtures thereof. In a preferred embodiment, the alkali metal is hydroxide is sodium carbonate (soda ash).

Due to the use of an alkali metal carbonate as alkaline source, other alkaline sources such as alkali metal hydroxides are not required. Preferably, the concentrated detergent composition therefore does not comprise alkali metal hydroxides.

In the context of the present invention, MGDA and GLDA may be used as free acids or as salts, preferably sodium salts. The alkali metal tripolyphosphate preferably is sodium tripolyphosphate (STPP).

These chelants are readily available to the person skilled in the art. For example, the trisodium salt of MGDA is sold under the trademark Trilon M by BASF, the tetrasodium salt of GLDA is available under the trademark Dissolvine GL from AkzoNobel.

In one preferred embodiment, the chelant is a mixture of MGDA, alkali metal tripolyphosphate, and GLDA.

The present invention provides for a detergent composition, in which the amount of chelant may be minimized while still maintaining good cleaning performance. In a preferred embodiment, the detergent composition, therefore, comprises at most 40% by weight, more preferably at most 35% by weight chelant. The lower limit of chelant is preferably 5% by weight, more preferably 10% by weight. In another preferred embodiment, the detergent composition comprises 5 to 40% by weight, preferably 10 to 35% by weight chelant. Here, the amount of chelant refers to the total amount of MGDA, GLDA, and alkali metal tripolyphosphate.

MGDA is a particularly preferred chelant, as it exhibits a particularly strong synergistic effect with percarbonate and the peroxidation catalyst. In a preferred embodiment, the detergent composition comprises as a chelant MGDA and optionally GLDA and/or alkali metal tripolyphosphate. In another preferred embodiment the detergent composition comprises 7 to 40% by weight, preferably 11 to 40% by weight, most preferably 16 to 35% by weight MGDA and optionally GLDA and/or alkali metal tripolyphosphate in addition to MGDA.

It is further preferable to minimize the amount of alkali metal tripolyphosphate used as chelant. Preferably, the detergent composition, therefore, comprises at most 28% by weight alkali metal tripolyphosphate, more preferably at most 25% by weight, most preferably at most 22% by weight.

In a preferred embodiment, the detergent composition comprises as chelant 7 to 35% by weight MGDA, 0 to 35% by weight GLDA, and 0 to 25% by weight alkali metal tripolyphosphate, while the total amount of chelant is not more than 35% by weight.

In another preferred embodiment, the detergent composition comprises as chelant 7 to 15% by weight MGDA, 2 to 6% by weight GLDA, and 20 to 25% by weight alkali metal tripolyphosphate, while the total amount of chelant is not more than 35% by weight.

In another preferred embodiment, the detergent composition does not comprise any alkali metal tripolyphosphate.

The optimal amount of chelant may be chosen based on the amount of percarbonate. The upper limit of the molar ratio is 3.4, preferably 3.0, more preferably 2.5. The lower limit of the molar ratio is 1.8, preferably 1.9, most preferably 2.0. The molar ratio of chelant to percarbonate is, therefore, in the range of 1.8 to 3.4, preferably 1.9 to 3.0, most preferably 2.0 to 2.5. Here, the molar ratio is calculated based on the total molar amount of MGDA, GLDA, and alkali metal tripolyphosphate.

In another embodiment, the detergent composition comprises 5 to 40% by weight chelant, while the molar ratio of chelant to percarbonate is in the range of 1.8 to 3.4.

The detergent composition comprises alkali metal percarbonate as a peroxygen compound. In a preferred embodiment, the detergent composition comprises 5 to 60% by weight, preferably 5 to 30% by weight, more preferably 5 to 25% by weight, most preferably 10 to 20% by weight alkali metal percarbonate. Suitable alkali metal percarbonates are for example sodium percarbonate and potassium percarbonate.

While it is known to use Mn and Fe as peroxidation catalysts, providing the metal in the form of a complex according to formula (I) has several advantages such as increasing the activity and the stability of the complex. In particular in the case of Mn complexes, the ligands L help to increase the solubility of the metal.

In a particularly preferred example the peroxidation catalyst is a dinuclear complex according to formula (II)

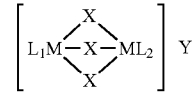

wherein $L_1$ and $L_2$ can either be separate ligands or where $L_1$ and $L_2$ can combine to be a single molecule.

Among the coordinating or bridging groups, the groups $O^{2-}$, $O_2^{2-}$, $CH_3O-$, $CH_3CO^{2-}$,

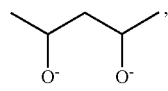

or Cl— are particularly preferred.

Preferably, the ligands are selected from the group consisting triazacyclononane, triazacyclononane derivatives, Schiff-base containing ligands, polypyridineamine ligands, pentadentate nitrogen-donor ligands, bispidon-type ligands, and macrocyclic tetraamidate ligands. Examples for those classes of ligands are described by R. Hage and A Lienke (Hage, Ronald; Lienke, Achim. Applications of Transition- Metal Catalysts to Textile and Wood-Pulp Bleaching. Angewandte Chemie International Edition, 2005, 45. Jg., Nr. 2, pp. 206-222).

Another group of preferred ligands are dicarboxylates, in particular oxalate.

Particularly preferred ligands are the compounds according to formulae (II) to (IV)

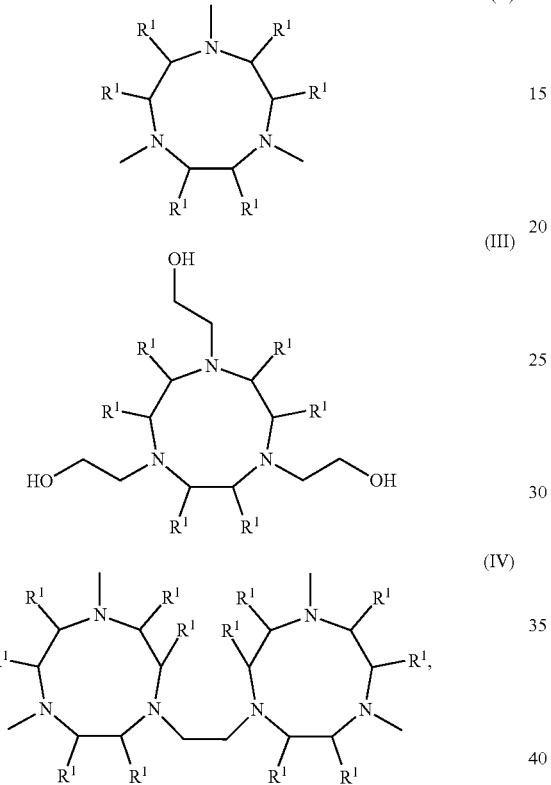

wherein each $R^1$ independently is hydrogen or a $C_1$ to $C_6$ alkyl group.

Other suitable ligands are the compounds according to formulae (V) to (XVIII)

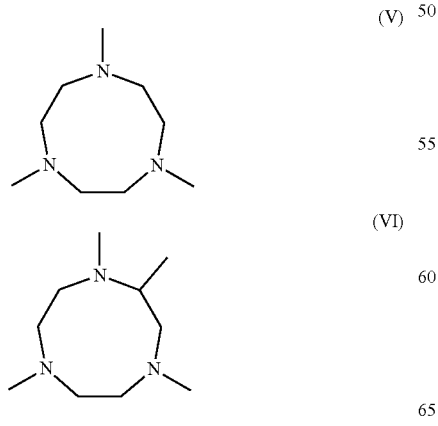

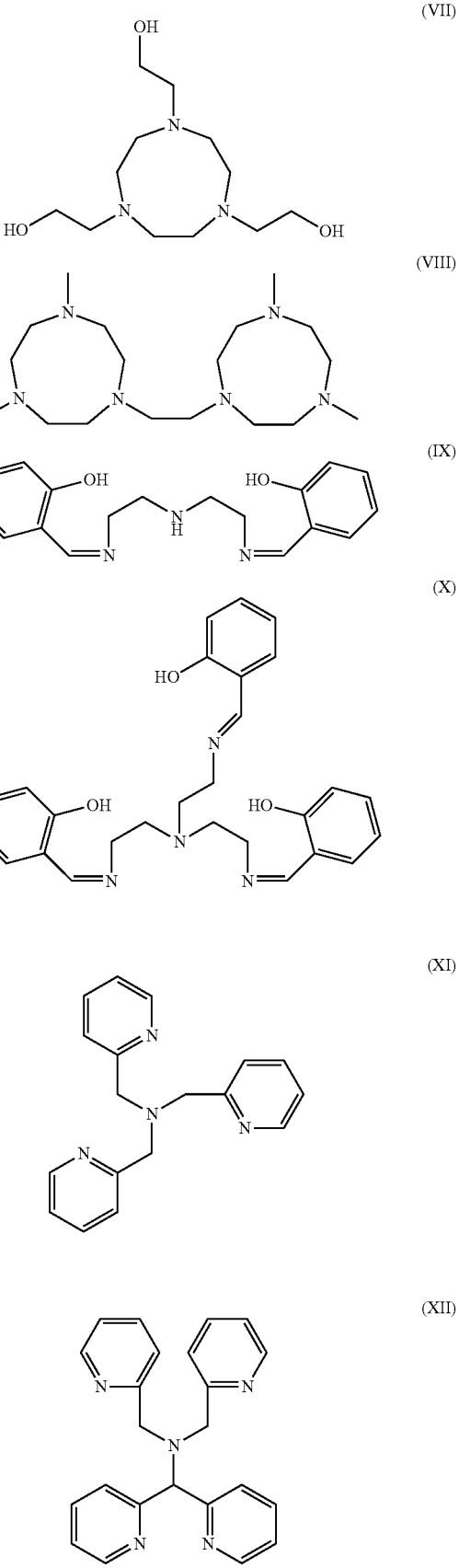

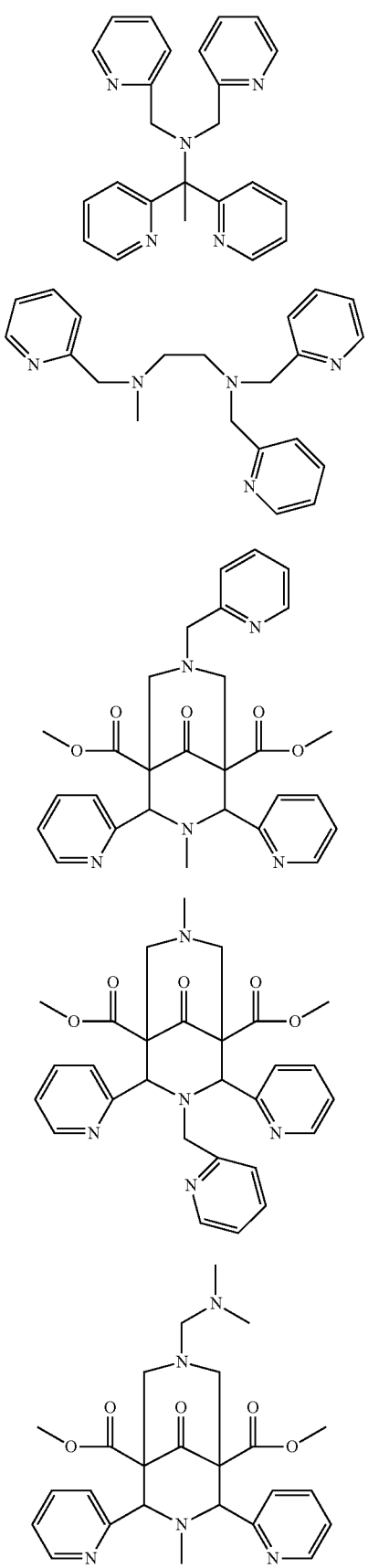

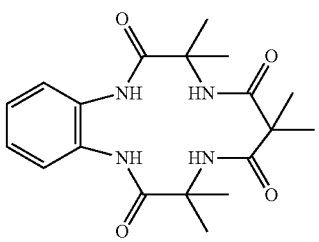

The ligands (V) to (X) are particularly suited if the metal M is Mn. The ligands (XII) to (XVIII) are particularly well-suited if the metal M is Fe. Ligand (XI) is equally suited for Mn and Fc.

The counter ion Y is selected depending on the charge of the complex $[(L_pM_q)_nX_r]$. The number of counter ions s is equal to the number of counter ions required to achieve charge neutrality. Preferably the number of counter ions s is 1 to 3. The type of counter ion Y for charge neutrality is not critical for the activity of the complex and can be selected from, for example, the group consisting of $Cl^-$, $Br^-$, $I^-$, $NO_3^-$, $ClO_4^-$, $NCS^-$, $BPh_4^-$, $BF_4^-$, $PF_6^-$, $R^2$—$SO_3^-$, $R^2$—$SO_4^-$, and $R^2$—$CO_2^-$, wherein $R^2$ is hydrogen or a $C_1$ to $C_4$ alkyl group. Particularly preferred counter ions are $PF_6^-$ and $ClO_4^-$.

In an especially preferred embodiment, the peroxidation catalyst is a complex according to formula (II), wherein M is manganese, X is selected from the group consisting of $O^{2-}$, $O_2^{2-}$, $CH_3O$—, $CH_3CO^{2-}$,

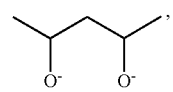

or Cl—, and the ligand L is a compound according to formulae (II) and/or (IV).

A peroxidation catalyst, wherein M is manganese and L is oxalate, is also preferred.

Particularly preferred peroxidation catalysts are the compounds according to formulae (XIX) and (XX), also referred to as MnTACN and MnDTNE, respectively.

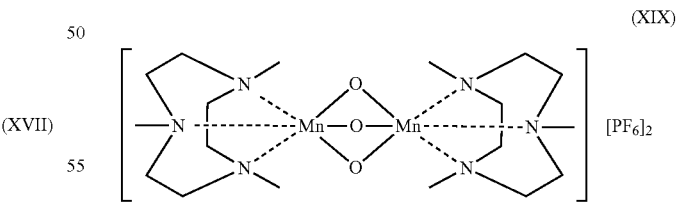

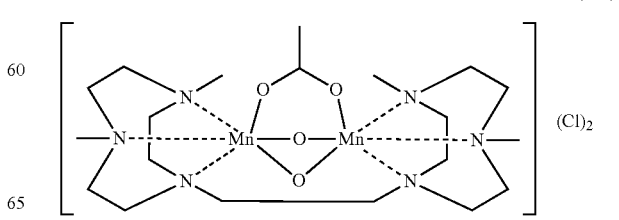

The detergent composition may comprise 0.0005 to 0.12% by weight of the metal M in the form of a peroxidation catalyst complex, preferably from 0.001 to 0.05% by weight.

In a preferred embodiment, the detergent composition comprises alkali metal carbonate,
- a chelant comprising MGDA, and optionally GLDA and/or alkali metal tripolyphosphate, alkali metal percarbonate, and
- a peroxidation catalyst selected from the compounds according to formulae (XIX) or (XX),
- wherein the molar ratio of chelant to alkali metal percarbonate is in the range of 2.0 to 2.5.

In another embodiment, the detergent composition comprises
- 35 to 45% by weight sodium carbonate,
- 20 to 25% by weight alkali metal tripolyphosphate,
- 5 to 15% by weight MGDA,
- 2 to 6% by weight GLDA,
- 10 to 20% by weight sodium percarbonate,
- and 0.01 to 0.05% by weight of a peroxidation catalyst according to formulae (XIX) or (XX),
- wherein the molar ratio of the total amount of sodium tripolyphosphate, MGDA, and GLDA to sodium percarbonate is in the range of 2.0 to 2.5.

The detergent composition of the present invention may further comprise at least one of the compounds selected from the list consisting of surfactants, activating agents, additional chelating/sequestering agents, silicates, detergent fillers or binding agents, defoaming agents, anti-redeposition agents, enzymes, dyes, odorants, and mixtures thereof.

A variety of surfactants can be used in the present composition, such as anionic, nonionic, cationic, and zwitterionic surfactants. Nonionic surfactants are particularly preferred. The detergent composition can comprise 0.5 to 20% by weight surfactant, preferably 1 to 15% by weight, most preferably 1.5 to 5% by weight. In a preferred embodiment, the detergent composition comprises 1.5 to 5% by weight nonionic surfactant.

Suitable anionic surfactants are, for example, carboxylates such as alkylcarboxylates (carboxylic acid salts) and polyalkoxycarboxylates, alcohol ethoxylate carboxylates, nonylphenol ethoxylate carboxylates; sulfonates such as alkylsulfonates, alkylbenzenesulfonates, alkylarylsulfonates, sulfonated fatty acid esters; sulfates such as sulfated alcohols, sulfated alcohol ethoxylates, sulfated alkylphenols, alkylsulfates, sulfosuccinates, alkylether sulfates; and phosphate esters such as alkylphosphate esters. Exemplary anionic surfactants include sodium alkylarylsulfonate, alpha-olefinsulfonate, and fatty alcohol sulfates.

Suitable nonionic surfactants are, for example, those having a polyalkylene oxide polymer as a portion of the surfactant molecule. Such nonionic surfactants include, for example, chlorine-, benzyl-, methyl-, ethyl-, propyl-, butyl- and other like alkyl-capped polyethylene glycol ethers of fatty alcohols; polyalkylene oxide free nonionics such as alkyl polyglycosides; sorbitan and sucrose esters and their ethoxylates; alkoxylated ethylene diamine; alcohol alkoxylates such as alcohol ethoxylate propoxylates, alcohol propoxylates, alcohol propoxylate ethoxylate propoxylates, alcohol ethoxylate butoxylates, and the like; nonylphenol ethoxylate, polyoxyethylene glycol ethers and the like; carboxylic acid esters such as glycerol esters, polyoxyethylene esters, ethoxylated and glycol esters of fatty acids, and the like; carboxylic amides such as diethanolamine condensates, monoalkanolamine condensates, polyoxyethylene fatty acid amides, and the like; and polyalkylene oxide block copolymers including an ethylene oxide/propylene oxide block copolymer such as those commercially available under the trademark Pluronic (BASF), and other like nonionic compounds. Silicone surfactants can also be used.

Suitable cationic surfactants include, for example, amines such as primary, secondary and tertiary monoamines with $C_{18}$ alkyl or alkenyl chains, ethoxylated alkylamines, alkoxylates of ethylenediamine, imidazoles such as a 1-(2-hydroxyethyl)-2-imidazoline, 2-alkyl-1-(2-hydroxyethyl)-2-imidazoline; and quaternary ammonium salts, as for example, alkylquaternary ammonium chloride surfactants such as n-alkyl($C_{12}$-$C_{18}$)dimethylbenzyl ammonium chloride, n-tetradecyldimethylbenzylammonium chloride monohydrate, naphthylene-substituted quaternary ammonium chloride such as dimethyl-1-naphthylmethylammonium chloride. The cationic surfactant can be used to provide sanitizing properties.

Suitable zwitterionic surfactants include, for example, betaines, imidazolines, and propinates.

If the detergent composition is intended to be used in an automatic dishwashing or warewashing machine, the surfactants selected, if any surfactant is used, can be those that provide an acceptable level of foaming when used inside a dishwashing or warewashing machine. It should be understood that warewashing compositions for use in automatic dishwashing or warewashing machines are generally considered to be low-foaming compositions.

The detergent composition may comprise an activating agent in to further increase the activity of the percarbonate. Such an activating agent is used in addition to the peroxidation catalyst. Suitable activating agents include sodium-4-benzoyloxy benzene sulphonate (SBOBS); N,N,N',N'-tetraacetyl ethylene diamine (TAED); sodium-1-methyl-2-benzoyloxy benzene-4-sulphonate; sodium-4-methyl-3-benzoyloxy benzoate; SPCC trimethyl ammonium toluyloxy benzene sulphonate; sodium nonanoyloxybenzene sulphonate, sodium 3,5,5,-trimethyl hexanoyloxybenzene sulphonate; penta acetyl glucose (PAG); octanoyl tetra acetyl glucose and benzoyl tetracetyl glucose. The detergent composition may comprise an activating agent or a mixture of activating agents at a concentration of 1 to 8% by weight, preferably 2 to 5% by weight.

The detergent composition may comprise additional chelating/sequestering other than MGDA, GLDA, and alkali metal tripolyphosphate.

Suitable additional chelating/sequestering agents are, for example, citrate, aminocarboxylic acid (other than MGDA or GLDA), condensed phosphate (other than alkali metal tripolyphosphate), phosphonate, and polyacrylate. In general, a chelating agent is a molecule capable of coordinating (i.e., binding) the metal ions commonly found in natural water to prevent the metal ions from interfering with the action of the other detersive ingredients of a cleaning composition. In general, chelating/sequestering agents can generally be referred to as a type of builder. The chelating/sequestering agent may also function as a threshold agent when included in an effective amount.

The detergent composition can include 0.1 to 20% by weight, preferably 0.1 to 10% by weight, more preferably 0.1 to 5% by weight additional chelating/sequestering agents. In another embodiment, the detergent composition does not comprise any additional chelating/sequestering agents to minimize the use of such agents.

Suitable aminocarboxylic acids include, for example, N-hydroxyethyliminodiacetic acid, nitrilotriacetic acid (NTA), ethylenediaminetetraacetic acid (EDTA), N-hydroxyethyl-ethylenediaminetriacetic acid (HEDTA), and diethylenetriaminepentaacetic acid (DTPA).

Examples of condensed phosphates include sodium and potassium orthophosphate, sodium and potassium pyrophosphate, sodium hexametaphosphate, and the like. A condensed phosphate may also assist, to a limited extent, in solidification of the composition by fixing the free water present in the composition as water of hydration.

The composition may include a phosphonate such as 1-hydroxyethane-1,1-diphosphonic acid $CH_3C(OH)$ [PO$(OH)_2]_2$(HEDP); amino tri(methylenephosphonic acid) $N[CH_2PO(OH)_2]_3$; aminotri(methylenephosphonate), sodium salt $(NaO)(HO)P(OCH_2N [CH_2PO(ONa)_2]2)$; 2-hydroxyethyliminobis(methylenephosphonic acid) $HOCH_2CH_2N [CH_2PO(OH)_2]_2$; diethylenetriaminepenta (methylenephosphonic acid) $(HO)_2POCH_2N[CH_2CH_2N[CH_2PO(OH)_2]_2]_2$; diethylenetriaminepenta(methylenephosphonate), sodium salt $C_9H_{(28-x)}N_3Na_xO_{15}P_5$ (x=7); hexamethylenediamine(tetramethylenephosphonate), potassium salt $C_{10}H_{(28-x)}N_2K_xO_{12}P_4$ (x=6); bis(hexamethylene)triamine(pentamethylenephosphonic acid) $(HO_2) POCH_2N [(CH_2)_6N[CH_2PO(OH)_2]_2]_2$; and phosphorus acid $H_3PO_3$.

Preferred phosphonates are 1-Hydroxy Ethylidene-1,1-Diphosphonic Acid (HEDP), aminotris(methylenephosphonic acid) (ATMP) and Diethylenetriamine penta(methylene phosphonic acid) (DTPMP).

A neutralized or alkaline phosphonate, or a combination of the phosphonate with an alkali source prior to being added into the mixture such that there is little or no heat or gas generated by a neutralization reaction when the phosphonate is added is preferred. The phosphonate can comprise a potassium salt of an organo phosphonic acid (a potassium phosphonate). The potassium salt of the phosphonic acid material can be formed by neutralizing the phosphonic acid with an aqueous potassium hydroxide solution during the manufacture of the solid detergent. The phosphonic acid sequestering agent can be combined with a potassium hydroxide solution at appropriate proportions to provide a stoichiometric amount of potassium hydroxide to neutralize the phosphonic acid. A potassium hydroxide having a concentration of from about 1 to about 50 wt % can be used. The phosphonic acid can be dissolved or suspended in an aqueous medium and the potassium hydroxide can then be added to the phosphonic acid for neutralization purposes.

The chelating/sequestering agent may also be a water conditioning polymer that can be used as a form of builder. Exemplary water conditioning polymers include anionic polymers, in particular polycarboxylates. Exemplary polycarboxylates that can be used as water conditioning polymers include polyacrylic acid, maleic/olefin copolymer, acrylic/maleic copolymer, polymethacrylic acid, acrylic acid-methacrylic acid copolymers, hydrolyzed polyacrylamide, hydrolyzed polymethacrylamide, hydrolyzed polyamide-methacrylamide copolymers, hydrolyzed polyacrylonitrile, hydrolyzed polymethacrylonitrile, and hydrolyzed acrylonitrile-methacrylonitrile copolymers.

The detergent composition may include the water conditioning polymer in an amount of 0.1 to 20% by weight, preferably 0.2 to 5% by weight.

Silicates may be included in the detergent composition as well. Silicates soften water by the formation of precipitates that can be easily rinsed away. They commonly have wetting and emulsifying properties, and act as buffering agents against acidic compounds, such as acidic soil. Further, silicates can inhibit the corrosion of stainless steel and aluminium by synthetic detergents and complex phosphates. A particularly well suited silicate is sodium metasilicate, which can be anhydrous or hydrated. The detergent composition may comprise 1 to 10% by weight silicates.

The composition can include an effective amount of detergent fillers or binding agents. Examples of detergent fillers or binding agents suitable for use in the present composition include sodium sulfate, sodium chloride, starch, sugars, and $C_1$-$C_{10}$ alkylene glycols such as propylene glycol. The detergent filler may be included an amount of 1 to 20% by weight, preferably 3 to 15% by weight.

A defoaming agent for reducing the stability of foam may also be included in the composition to reduce foaming. When included the defoaming agent can be provided in an amount of 0.01 to 15% by weight.

Suitable defoaming agents include, for example, ethylene oxide/propylene block copolymers such as those available under the name Pluronic N-3, silicone compounds such as silica dispersed in polydimethylsiloxane, polydimethylsiloxane, and functionalized polydimethylsiloxane, fatty amides, hydrocarbon waxes, fatty acids, fatty esters, fatty alcohols, fatty acid soaps, ethoxylates, mineral oils, polyethylene glycol esters, and alkyl phosphate esters such as monostearyl phosphate.

The composition can include an anti-redeposition agent for facilitating sustained suspension of soils in a cleaning solution and preventing the removed soils from being redeposited onto the substrate being cleaned. Examples of suitable anti-redeposition agents include fatty acid amides, fluorocarbon surfactants, complex phosphate esters, styrene maleic anhydride copolymers, and cellulosic derivatives such as hydroxyethyl cellulose, hydroxypropyl cellulose, and the like. The anti-redeposition agent can be included in an amount of 0.5 to 10% by weight, preferably 1 to 5% by weight.

The composition may include enzymes that provide desirable activity for removal of protein-based, carbohydrate-based, or triglyceride-based soil. Although not limiting to the present invention, enzymes suitable for the cleaning composition can act by degrading or altering one or more types of soil residues encountered on crockery thus removing the soil or making the soil more removable by a surfactant or other component of the cleaning composition. Suitable enzymes include a protease, an amylase, a lipase, a gluconase, a cellulase, a peroxidase, or a mixture thereof of any suitable origin, such as vegetable, animal, bacterial, fungal or yeast origin. The detergent composition may comprise 1 to 30% by weight enzymes, preferably 2 to 15% by weight, more preferably 3 to 10% by weight, most preferably 4 to 8% by weight.

Various dyes, odorants including perfumes, and other aesthetic enhancing agents can be included in the composition. Dyes may be included to alter the appearance of the composition, as for example, Direct Blue 86 (Miles), Fastusol Blue (Mobay Chemical Corp.), Acid Orange 7 (American Cyanamid), Basic Violet 10 (Sandoz), Acid Yellow 23 (GAF), Acid Yellow 17 (Sigma Chemical), Sap Green (Keystone Analine and Chemical), Metanil Yellow (Keystone Analine and Chemical), Acid Blue 9 (Hilton Davis), Sandolan Blue/Acid Blue 182 (Sandoz), Hisol Fast Red (Capitol Color and Chemical), Fluorescein (Capitol Color and Chemical), and Acid Green 25 (Ciba-Geigy).

Fragrances or perfumes that may be included in the compositions include, for example, terpenoids such as citronellol, aldehydes such as amyl cinnamaldehyde, a jasmine such as C1S-jasmine or jasmal, and vanillin.

The detergent composition may be provided, for example, in the form of a solid, a powder, a liquid, or a gel. Preferably, the detergent composition is provided in the form of a solid or a powder.

The components used to form the detergent composition can include an aqueous medium such as water as an aid in processing. It is expected that the aqueous medium will help provide the components with a desired viscosity for processing. In addition, it is expected that the aqueous medium may help in the solidification process when is desired to form the detergent composition as a solid. When the detergent composition is provided as a solid, it can, for example, be provided in the form of a block or pellet. It is expected that blocks will have a size of at least about 5 grams, and can include a size of greater than about 50 grams. It is expected that the detergent composition will include water in an amount of 1 to 50% by weight, preferably 2 to 20% by weight.

When the components that are processed to form the detergent composition are processed into a block, it is expected that the components can be processed by extrusion techniques or casting techniques. In general, when the components are processed by extrusion techniques, it is believed that the detergent composition can include a relatively smaller amount of water as an aid for processing compared with the casting techniques. In general, when preparing the solid by extrusion, it is expected that the detergent composition can contain 2 to 10% by weight water. When preparing the solid by casting, it is expected that the amount of water is 20 to 40% by weight.

In a second aspect the present invention also relates to the use of a detergent composition as described above as a ware washing detergent. Preferably, the detergent composition is used for the removal of tea and coffee stains.

Preferably, the detergent composition is diluted at a concentration of 0.1 to 10 g/l, preferably 0.5 to 5 g/l, most preferably 1 to 1.5 g/l to provide a use solution.

In a particular preferred embodiment the detergent composition is used as a warewashing detergent at a temperature of 20 to 85° C., preferably from 50 to 75° C.

EXAMPLES

The following example illustrates the invention by testing the removal of tea soil from ceramic tiles.

Ceramic tiles (5.1×15.2 cm white, glazed ceramic tiles) were stained with tea soil (Lipton brand tea) according to the following procedure. Hard water having a hardness of >249.9 mg/l $CaCO_3$ was heated to >71° C. The tea was then mixed into the hot hard water. The ceramic tiles were then immersed into the tea for 1 min and then taken out for 1 min to dry. This procedure was repeated until a stain was formed, which was typically after 25 cycles. The tiles were then cured for 48 hrs at room temperature. At this time the tiles are ready for testing.

Cleaning test were carried out in a standard automatic dishwasher. The cleaning efficiency was evaluated by visually comparing the amount of soil left on the tiles after one full cleaning cycle to the amount of soil on the tiles before the cleaning procedure. The percentage of stain removal was quantified by image analysis of scanned test tiles. The results were rated according to table 1:

TABLE 1

| Rating | % of stain removal |
| --- | --- |
| 5 | 100 |
| 4 | 80-99.9 |
| 3 | 20-79.9 |
| 2 | <20 |
| 1 | no removal |

A rating of 5 was considered to be an excellent result. A rating of 4 (at least 80% stain removal) was considered to be an acceptable cleaning performance.

Cleaning performance tests were carried out by charging the washing tank with the detergent compositions at the desired use concentration. Unless otherwise noted, all amounts in the following are given in % by weight or ppm by weight, respectively.

In a first experiment, the effect of adding a mixture of sodium percarbonate and the peroxidation catalyst bis(N,N',N"-trimethyl-1,4,7-triazacyclononane)-trioxo-dimanganese (IV) di(hexafluorophosphate) monohydrate (Dragon PF6) to a mixture of soda ash, Trilon M (trisodium salt of methylglycinediacetic acid), STPP, and GLDA was tested. The results are shown in table 2.

TABLE 2

| Formula | Tea stain rating at use concentration | | |
| --- | --- | --- | --- |
| | 1000 ppm | 1200 ppm | 1400 ppm |
| 44% Ash, 8% Trilon M, 22% STPP, 4% GLDA | 1 | 2 | 5 |
| 44% Ash, 8% Trilon M, 22% STPP, 4% GLDA, 15% sodium percarbonate, 0.025% Dragon PF6 | 1 | 4 | 5 |

This first experiment shows that a better tea stain removal performance can be achieved when sodium percarbonate and catalyst are combined with chelants compared to a formula containing chelants only.

In a second experiment, the effect of adding 150 ppm sodium percarbonate and 0.025 ppm Dragon PF6 to varying concentrations of Trilon M was tested in the presence of 800 ppm by weight sodium carbonate and 40 ppm by weight nonionic surfactant (polyoxypropylene-polyoxethylene block copolymer, Pluronic $25R^2$). The results are shown in table 3.

TABLE 3

| | % of stain removal | |
| --- | --- | --- |
| Trilon M level (ppm) | Trilon M only | With Percarbonate and Dragon PF6 |
| 0 | N/A | −11.6 |
| 350 | −5.3 | 18.9 |
| 375 | −6.3 | 53.2 |
| 400 | 2.1 | 48.1 |
| 425 | 85.4 | N/A |

This second experiment shows that for satisfactory stain removal, a use concentration of 425 ppm Trilon M is required. In contrast, by adding 150 ppm sodium percarbonate and 0.025 ppm Dragon PF6, good stain removal can already be achieved at a Trilon M concentration of as low as 375 ppm.

In a third experiment, the effect of different concentrations of sodium percarbonate, Dragon PF6, and Trilon M was tested in the presence of 800 ppm sodium percarbonate. The results are shown in table 4.

TABLE 4

| Trilon M (ppm) | Percarbonate (ppm) | Dragon PF6 (ppm) | Tea stain rating |
|---|---|---|---|
| 350 | — | — | 2 |
| 375 | — | — | 3 |
| 400 | — | — | 4 |
| 425 | — | — | 5 |
| 50 | 200 | 0.05 | 2.5 |
| 50 | 400 | 0.1 | 4 |
| 50 | 500 | 0.125 | 5 |
| 50 | 600 | 0.15 | 5 |
| 350 | 100 | 0.025 | 3.5 |
| 350 | 200 | 0.05 | 4 |

The third experiment showed that a concentration of at least 400 ppm Trilon M or at least 400 ppm sodium percarbonate is required for an acceptable stain removal (rating 4 or higher). However, a good result can also be achieved when combining 350 ppm Trilon M with 200 ppm sodium percarbonate (corresponding to a molar ratio of chelant to percarbonate of 1.015). This demonstrates a synergistic effect between the chelant and percarbonate.

The invention claimed is:

1. A detergent composition consisting of:
   alkali metal carbonate,
   a chelant that is methylglycinediacetic acid (MGDA) and optionally glutamic acid N,N-diacetic acid (GLDA) and/or alkali metal tripolyphosphate,
   alkali metal percarbonate,
   a peroxidation catalyst according to formula (XIX) or formula (XX):

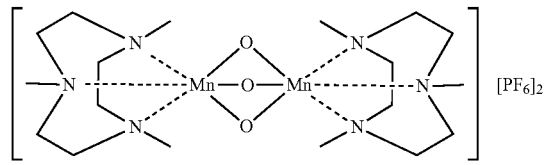

(XIX)

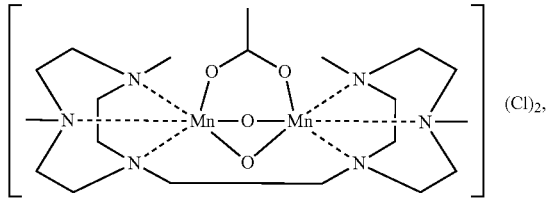

(XX)

optionally water, silicates, detergent fillers or binding agents, polyoxypropylene-polyoxethylene block copolymer nonionic surfactants, enzymes, dyes, odorants, aminotris(methylenephosphonic acid), and mixtures thereof;
wherein the molar ratio of chelant to alkali metal percarbonate is in the range of 1.8 to 3.4;
wherein said molar ratio is calculated based on the total molar amount of methylglycinediacetic acid, glutamic acid N,N-diacetic acid, and alkali metal tripolyphosphate;
wherein for the purpose of calculating said molar ratio alkali metal percarbonate is assumed to have the formula $2(M_2CO_3) \cdot 3H_2O_2$, where M represents an alkali metal.

2. The detergent composition according to claim 1, wherein the chelant is MGDA, GLDA, and an alkali metal tripolyphosphate.

3. The detergent composition according to claim 1, wherein the detergent composition comprises at most 40% by weight chelant.

4. The detergent composition according to claim 1, comprising at most 28% by weight alkali metal tripolyphosphate.

5. The detergent composition according to claim 1, wherein the composition comprises 5 to 30% by weight alkali metal percarbonate.

6. The detergent composition according to claim 1, wherein the composition provides a pH of at least 8 when diluted in distilled water at a concentration of 1 g/l.

7. The detergent composition according to claim 1, wherein the composition includes 0.01 to 0.05% by weight of the peroxidation catalyst.

8. The detergent composition of claim 1, wherein the detergent composition includes 1.5 to 5% by weight polyoxypropylene-polyoxethylene block copolymer nonionic surfactant.

9. A detergent use solution consisting of the detergent composition according to claim 1 and water, wherein the detergent composition is present at a concentration of 0.1 to 10 g/l.

10. The detergent composition according to claim 1, wherein the detergent composition does not comprise alkali metal tripolyphosphate.

11. The detergent use solution according to claim 9, wherein the peroxidation catalyst is present in the use solution in an amount of between about 0.05 ppm and about 0.15 ppm.

12. The detergent use solution according to claim 9, wherein the use solution has a temperature of 20 to 85° C.

* * * * *